Figure 1:
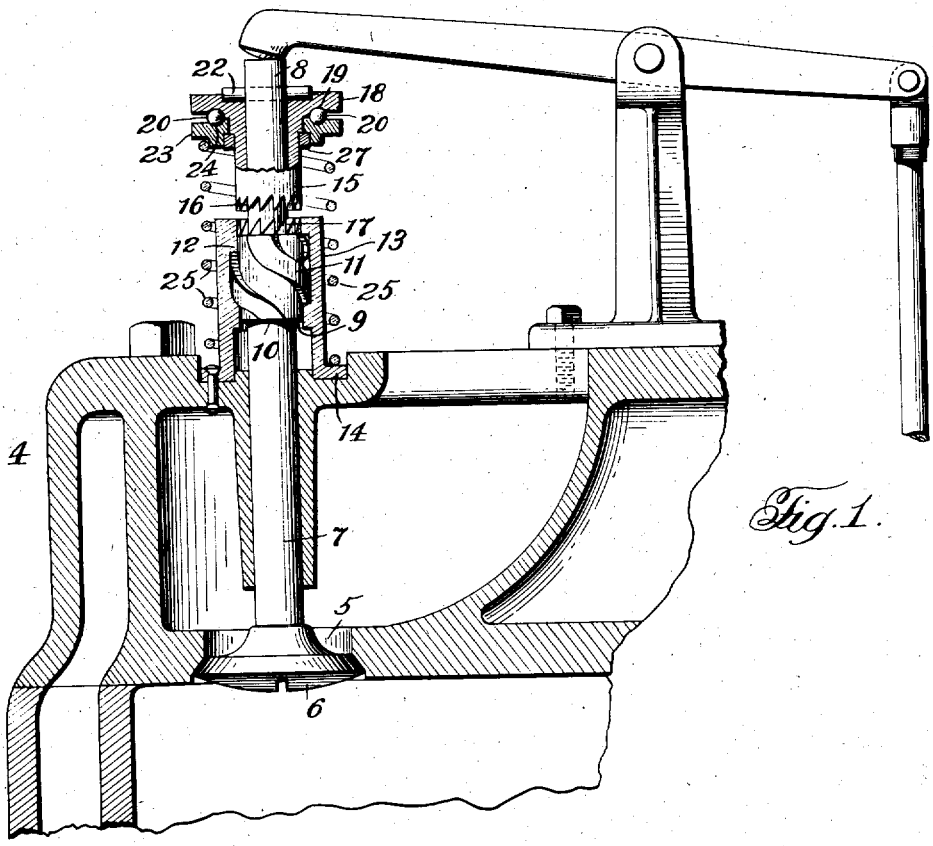

March 9, 1926. Re. 16,286

W. G. BUCK

VALVE FOR INTERNAL COMBUSTION ENGINES

Original Filed March 23, 1917

Inventor:

Wilmer G. Buck

Witness:

Jas. E. Hutchinson

Reissued Mar. 9, 1926.

Re. 16,286

UNITED STATES PATENT OFFICE.

WILMER G. BUCK, OF FREMONT, NEBRASKA, ASSIGNOR, BY MESNE ASSIGNMENTS, TO CONTINENTAL ENGINEERING CORPORATION, OF OMAHA, NEBRASKA, A CORPORATION OF NEBRASKA.

VALVE FOR INTERNAL-COMBUSTION ENGINES.

Original No. 1,244,287, dated October 23, 1917, Serial No. 156,845, filed March 23, 1917. Application for reissue filed July 17, 1920. Serial No. 397,123.

*To all whom it may concern:*

Be it known that I, WILMER G. BUCK, a citizen of the United States, residing at Fremont, in the county of Dodge and State of Nebraska, have invented certain new and useful Improvements in Valves for Internal-Combustion Engines, of which the following is a specification.

The present invention relates to a valve and valve operating means adapted for use in connection with gasolene motors for automobiles, etc.

One object of the invention is to arrange a means for giving a partial rotative movement to the valve about its longitudinal axis while it is unseated, thereby at each operation bringing into the path of the hot gases a different portion of the valve and valve stem, thus eliminating the warping and distortion that would be encountered if the valve were operated without this turning feature.

Another object of the invention is to provide a ball-bearing or anti-friction mounting about which the valve stem rotates, so as to eliminate any objectionable friction and binding during such rotative movement, and to arrange this mounting in a manner whereby it is capable of a quick and easy assemblance and disassemblance.

A further object of the invention is to provide a connection between the valve stem and a portion of the anti-friction mounting so as to make a positive unitary movement between the valve stem and this portion of the mounting, and, at the same time, allow of the separation of the valve stem from the mounting if the same should become necessary, and to allow a quick and ready assemblance of the mounting on the valve stem.

Other objects of the invention are, to provide a threaded member which will give a partial rotative movement to the valve stem; to arrange a clutch connection for effecting such partial rotative movement, which becomes operative at a certain period in the movement of the valve; and to provide a continuous shoulder on the valve stem against which the threaded member for giving the partial rotative movement abuts.

The invention further consists in the features of construction and combination of parts hereinafter described and claimed.

Figure 3:
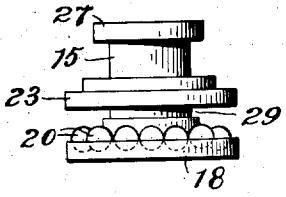
Figure 2:
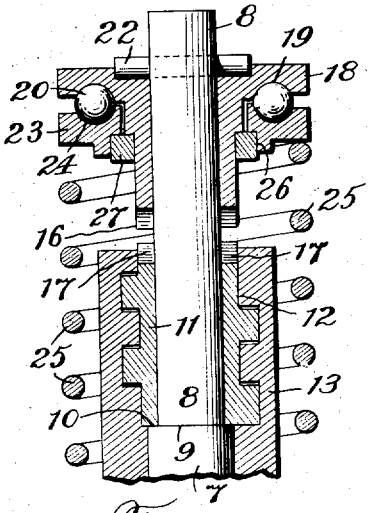
Figure 4:
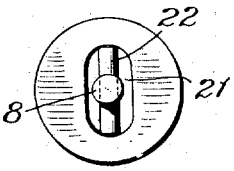

In the drawings:

Figure 1 is a view showing a cross section of a portion of an engine casing with the valve of the present invention mounted in operative position, and with certain portions of the valve in section;

Fig. 2, a detail section, on an enlarged scale, of the upper portion of the valve;

Fig. 3, an elevation showing the arrangement of the parts comprising the anti-friction mounting previous to their assemblance; and Fig. 4, a top view of the valve.

The present invention relates to certain improvements and structural changes in the valve shown and described in Patent No. 1,183,852, issued to me May 23, 1916, and entitled "Valves for internal combustion engines." In the present application the valve is shown as applied to an overhead system, although such statement is not intended to imply any limitation on the present application or upon the issued patent above referred to.

Referring now to the drawings, the invention is shown in conjunction with a cylinder 4 of an internal combustion engine, which may be of any size and arrangement. The cylinder contains a valve opening 5, which may be either inlet or exhaust; and controlling this opening is a valve head 6. This head is attached to a valve stem 7, which is reduced at its upper portion 8, thereby providing a shoulder 9 intermediate its length. Against this shoulder abuts the lower end 10 of an exteriorly threaded member 11, which member is rotatively mounted upon the reduced portion 8 of the valve stem. The threads on the exterior of this member, as shown, are of a spiral formation and are adapted to mesh with interior spiral threads 12 in a barrel 13, which is positioned upon the cylinder. The barrel terminates, in the construction shown, in a flanged end 14.

Also mounted upon the reduced portion 8 of the valve stem is a sleeve 15 having, on its lower end, clutch teeth 16 adapted to mesh with clutch teeth 17 on the upper end of the threaded member 11. This sleeve 15 terminates in a head 18, having formed therein a raceway 19 for ball-bearings 20. The head is further provided with an elongated recess 21 extending partially therethrough, as will be understood from the drawings. In this recess rests a pin or other member 22 carried by the upper end of the valve stem and extending crosswise of said stem and to a point beyond the periphery thereof. This pin is approximately equal to the length of the recess 21, so that when the pin is placed within the recess, it forms an interlocking connection between the valve stem and head 18, which causes both of these parts to rotate in unison; and the amount of engaging surface between the head and pin is sufficient so that the connection is strong and rigid and will not give way by reason of any shearing strains, nor permit any lost motion between the head and valve stem but will make them turn as a unit.

Below the head 18 is a collar 23 containing a raceway 24, which cooperates with the raceway 19 to form the complete raceway for the ball-bearings 20. As will be seen from the drawings, this collar 23 is arranged with a loose fit as respects the head 18, so that this head may revolve without turning the collar. The collar is held upward and in engagement with the balls by means of a spring 25 interposed between the lower face of the collar and the flange 14 of the barrel 13. This spring, in addition to holding the collar against rotative movement when the head is turned, moves the valve back to normal or seated condition. The collar 23, on its under face, is provided with a groove 26, in which seats a ring 27 having a driving fit upon the sleeve 15, and when this ring is driven into position as in Fig. 1, the collar 23 and head 18 are held against movement toward and from one another, so that they are not capable of a separation.

The construction of the ball-bearing raceway above described is one which is very advantageous in assembling or disassembling the device. When it is desired to assemble said ball-bearing mounting the parts are placed in the position shown in Fig. 3, wherein the ring 27 is spaced away from the collar 23, and the collar 23 in turn is spaced away from the head 18. The balls are then placed within the raceway 19 of the head 18, and the collar 23 is dropped to position. Then, by means of a suitable tool, the ring 27 is driven downward upon the sleeve 15 until it lies within the groove 26 of the collar 23; and owing to the said ring having a driving fit upon the sleeve 15, the collar 23, head 18, and sleeve 15 are locked in position, so that the ball-bearing mounting is completely assembled. This mounting is then placed over the stem and pressed down until the clutch surfaces 16 and 17 engage. This will allow the pin 22 to be driven into the shaft. The mounting is then released, and the spring 25 will force it upward and the pin 22 will enter the recess 21 in the head 18. Thus the mourting is placed in position on the valve stem. Previous to the placing of the mounting on the stem, the barrel 13, threaded member 11, and spring 25 will have been placed in position, so that when the pin 22 is driven into place on the valve stem, the parts of the valve are all assembled and ready for operation. The parts can be disassembled through the same steps, except that they will be made in reverse order.

The operation of the device is as follows:

When the arm 28 strikes the end of the valve stem or the tappet head thereon, it depresses the valve stem, and such depression moves the sleeve 15 downward through the action of the pin 22 against the head 18. This brings the clutch surfaces 16 and 17 into engagement, and then upon further downward movement, the sleeve 15 is rotated, due to the rotation of the threaded member 11 within the barrel 13; and as the sleeve 15 and valve stem are locked together, so as to turn in unison, a rotative movement is imparted to the valve stem and to the valve, which causes a different portion of the valve to be exposed to the action of the hot gases each time the valve is operated.

When the cam member releases from the tappet, the spring 25 acts to restore the valve to its normal or seated position; and immediately when the spring acts, it moves the valve stem upward and separates the clutch surfaces 16 and 17 so that the valve returns to normal position with a straight, non-rotative movement. It is during this return movement that the shoulder 9 on the valve stem functions. When the stem moves upwardly, the shoulder engages the lower face 10 of the threaded member 11 and restores said member to normal position. The shoulder makes an extended and firm connection with the lower end of the threaded member, insuring a positive operation. When the threaded member is returned to normal position, it rotates, but owing to the fact that the clutch connection is broken, such rotative movement is not imparted to the valve stem.

When the turning movement is imparted it will be apparent that the stem turns upon the ball-bearings or anti-friction members 20 through the arrangement of the head 18, pin 22, and associated parts, and that the said stem is not forced to turn against the resisting action of the spring 25. This spring being under compression when the turning movement is carried out, if the valve stem were forced to turn upon the spring, it would be difficult, if not impossible, to operate with a turning movement; but in the present construction the spring bears against the collar 23, and as this collar does not rotate with the valve stem, it is evident that a free and easy rotation of the stem is permitted.

The sleeve 15 is formed with an enlarged portion 29 (see Figs. 2 and 3), about which the collar 23 lies with a loose fit. When the ring 27 is driven into place, it rests against the lower shoulder of the enlarged portion 29 and the lower face of the collar 23, so that it has a firm and even bearing.

There may be structural changes made in the parts shown and described, and the invention is not to be limited except as may be by the terms of the appended claims.

I claim:

1. In a valve of the class described, the combination of a valve stem, a valve member on the stem, a sleeve connected to the stem, an outer ball race member connected to said sleeve, an inner ball race member loose with respect to the sleeve, balls associated with said race members, said race members being disposed one below the other, means for imparting a rotating movement to the sleeve to turn the stem and valve member during the valve movements, a ring having a driving fit on the sleeve, said inner race member having a recess in its outer face to receive the ring, and said sleeve being formed with a shoulder about which the inner race member has a loose bearing, said ring when driven into said recess abutting against said shoulder and acting to hold the said race members against separating movement, substantially as described.

2. In a valve of the class described, the combination of a valve stem reduced at one end to form a shoulder medially thereof, a valve member on the thick end of said stem, a member loosely mounted on the reduced end of said stem with one end of said member bearing against said shoulder, a clutch surface on the opposite end of said member, a sleeve on the reduced end of said stem, means for connecting the sleeve with the stem, a clutch surface on the sleeve adapted to engage with the clutch surface on said member when the stem is moved in one direction, means for imparting a rotative movement to said member during said clutch engagement whereby the valve is given a rotative movement, means acting to break the clutch connection when the valve stem starts moving in the opposite direction, and said shoulder engaging said member during such opposite movement and acting to restore it to normal position, substantially as described.

3. In a valve of the class described, the combination of a valve member, a removable separable ball-bearing associated with the valve member to facilitate the turning of the valve, means for imparting a rotating movement to the valve member during the valve movements including a clutch connection, means acting to break the clutch connection, and other detachable means carried by the ball bearing for holding the separable ball-bearing intact when the latter is disassociated from the valve stem, substantially as described.

4. In a valve of the class described, the combination of a valve stem, a valve member on the stem, a sleeve fastened to the stem to prevent relative rotation between the sleeve and the stem, an outer ball race member connected to said sleeve, an inner ball race member loose with respect to the sleeve, balls associated with said race members, said race members being disposed one below the other, a relatively rotative member mounted on the valve stem, a clutch connection between the rotative member and the sleeve for imparting a rotating movement to the sleeve to turn the stem and valve member during one of the valve movements, means for separating said clutch connection when the stem is moved in the opposite direction and means carried by the sleeve and coacting with the inner ball race member for holding said race members against separating movement, substantially as described.

5. In a valve of the class described, the combination of a valve stem, a valve member on the stem, a sleeve fastened to the stem to prevent relative rotation between the sleeve and the stem, an outer ball race member connected to said sleeve, an inner ball race member loose with respect to the sleeve, balls associated with said race member, said race member being disposed, one below the other, means carried by the sleeve for holding the race members against separating movement, a one-way acting clutch for imparting a rotating movement to the sleeve to turn the stem and valve member during one of the valve movements, and means for separating said clutch connection when the valve is moved in the opposite direction, substantially as described.

6. In a valve of the class described, the combination of a valve stem, a valve member on the stem, a sleeve fastened to the stem to prevent relative rotation between the sleeve and the stem, an outer ball race member connected to said sleeve, an inner ball race member loose with respect to the sleeve, balls associated with said race members, said race members being disposed one below the other, a clutch connection coactive with said sleeve for imparting a rotating movement to the sleeve to turn the stem and valve member during one of the valve movements, means for separating said clutch connection during the opposite movement of said valve, a ring having a driving fit on the sleeve, and said ring when forced against the inner race member holding the race members against separating movement, substantially as described.

7. In a valve of the class described, the combination of a valve stem, a valve member on the stem, means for imparting a step by step rotation of the valve member during the movement of the valve stem in one direction including a clutch connection, means acting to break the clutch connection during the opposite movement of said valve stem, a removable separable ball bearing associated with the valve stem to facilitate the turning of the valve, and other detachable means carried by the ball bearing intact when the latter is disassociated from the valve stem, substantially as described.

8. In a valve of the class described, the combination of a valve stem, a valve member on the stem, means for imparting a step by step rotation to the valve member during the movement of the valve stem in one direction including a clutch connection, means actuating to break the clutch connection during the opposite movement of said valve stem, a ball bearing facilitating the turning of the valve, said bearing comprising oppositely disposed members formed with cooperating raceways for balls, balls therein, a member removably inserted through the valve stem and extending crosswise of the stem to a point beyond the stem, and one of said oppositely disposed members having a recess therein to interlock with said stem member to prevent relative rotation between said oppositely disposed member and the valve stem, substantially as described.

In testimony whereof, I hereunto affix my signature.

WILMER G. BUCK.